US012311507B1

(12) United States Patent
Albin

(10) Patent No.: US 12,311,507 B1
(45) Date of Patent: May 27, 2025

(54) SCREWDRIVER WITH A TOOL GRIPPING FLANGE

(71) Applicant: Stephen D. Albin, Los Altos, CA (US)

(72) Inventor: Stephen D. Albin, Los Altos, CA (US)

( * ) Notice: Subject to any disclaimer, the term of this patent is extended or adjusted under 35 U.S.C. 154(b) by 0 days.

(21) Appl. No.: 19/079,788

(22) Filed: Mar. 14, 2025

Related U.S. Application Data

(63) Continuation of application No. 18/950,902, filed on Nov. 18, 2024, now Pat. No. 12,269,145, which is a continuation-in-part of application No. 18/101,505, filed on Jan. 25, 2023, now abandoned.

(60) Provisional application No. 63/305,566, filed on Feb. 1, 2022.

(51) Int. Cl.

| | |
|---|---|
| ***B25B 15/02*** | (2006.01) |
| ***B25G 1/00*** | (2006.01) |
| *B25B 13/46* | (2006.01) |
| *B25B 13/48* | (2006.01) |
| *B25B 23/00* | (2006.01) |

(52) U.S. Cl.
CPC .............. *B25B 15/02* (2013.01); *B25G 1/005* (2013.01); *B25B 13/461* (2013.01); *B25B 13/481* (2013.01); *B25B 23/0021* (2013.01)

(58) Field of Classification Search
CPC . B25B 23/0021; B25B 13/461; B25B 13/481; B25B 15/00; B25B 15/02; B25G 1/002; B25G 1/005
USPC ........................................................ D8/82, 86
See application file for complete search history.

(56) References Cited

U.S. PATENT DOCUMENTS

| | | | | |
|---|---|---|---|---|
| 3,361,170 A * | 1/1968 | Hilton | B25G 1/002 | 81/177.5 |
| 3,561,510 A * | 2/1971 | Johnson | B25G 1/005 | 81/439 |
| 7,398,712 B1 * | 7/2008 | Hsieh | B25B 15/02 | 81/492 |
| 12,269,145 B2 * | 4/2025 | Albin | B25B 15/02 | |
| 2006/0016298 A1 * | 1/2006 | Chang | B25B 15/00 | 81/177.5 |
| 2021/0114198 A1 * | 4/2021 | Lin | B25G 1/005 | |

* cited by examiner

*Primary Examiner* — David B. Thomas
(74) *Attorney, Agent, or Firm* — Beyer Law Group LLP

(57) ABSTRACT

A screwdriver with a tool gripping flange is provided. The tool gripping flange includes a pair of perpendicular, longitudinally elongated pry slots that intersect along a longitudinal axis of the screwdriver's shaft.

1 Claim, 6 Drawing Sheets

SCREWDRIVER WITH A TOOL GRIPPING FLANGE

CROSS REFERENCE TO RELATED APPLICATIONS

This application is a Continuation of U.S. application Ser. No. 18/950,902, filed Nov. 18, 2024, which is a Continuation-in-Part of U.S. patent application Ser. No. 18/101,505, filed Jan. 25, 2023, which claims priority to Provisional Application No. 63/305,566, dated Feb. 1, 2022. The contents of all of these priority applications are incorporated herein by reference in their entirety.

BACKGROUND OF THE INVENTION

Field of the Invention

The present disclosure relates to screwdrivers and socket wrench extensions. In one aspect, the present disclosure relates to extension bars for socket wrench extensions for ratchet wrenches. In another aspect the present disclosure relates to screwdrivers having tool gripping flanges.

SUMMARY

In one aspect, a screwdriver includes a handle, a shaft that extends distally from the handle, and a drive tip at a distal end of the shaft. A tool gripping flange is integrally formed with the shaft at a location between the handle and the drive tip. The tool gripping flange is enlarged relative to the shaft and has substantially flat front and back surfaces. The tool gripping flange including first and second pry slots that extend through the tool gripping flange and intersect along a longitudinal centerline of the shaft. The first pry slot is elongated longitudinally and extends laterally from the front surface of the tool gripping flange to the back surface of the tool gripping flange such that the first pry slot opens on both the front and back surfaces of the tool gripping flange. The second pry slot is elongated longitudinally and extends through the tool gripping flange from a first side edge of the tool gripping flange to a second side edge of the tool gripping flange. The first and second pry slots extend substantially perpendicular to each other and intersect along a longitudinal centerline of the shaft. The first and second pry slots are each unincumbered such that a user may selectively (i) insert a pry tool into the first or second pry slot to facilitate adding torque to the screwdriver during use, and alternatively (ii) engage the front and back surfaces of the tool griping flange with a gripping tool to facilitate adding torque to the screwdriver during use. A thickness of the tool gripping flange between the top and bottom surfaces is narrower than a width of the tool gripping flange between the first and second surfaces such that a lateral cross section of the tool gripping flange extending through the top surface, the bottom surface, the first side surface and the second side surface is substantially rectangular. The front and back surfaces of the tool gripping flange are substantially parallel. The first and second side edges of the tool gripping flange are substantially parallel. A width of the tool gripping flange between the first and second side surfaces is wider than distally and proximally adjacent portions of the screwdriver.

These and other features of the present disclosure will be described in more detail below in the detailed description of the disclosure and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present disclosure will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In the use of socket wrenches an extension bar may be used to provide increased access to nuts and bolts. The socket wrench would be placed on one end of the extension bar and a socket would be placed at the opposite end of the extension bar. The socket would engage with a nut or bolt. A socket wrench such as a ratchet wrench would be used to apply a rotational force on the extension bar, which would provide a rotational force on the socket in order to rotate the nut or bolt. The application of the rotational force by the socket wrench may be unstable, causing the socket to slip off of the nut or bolt.

Figure 1:
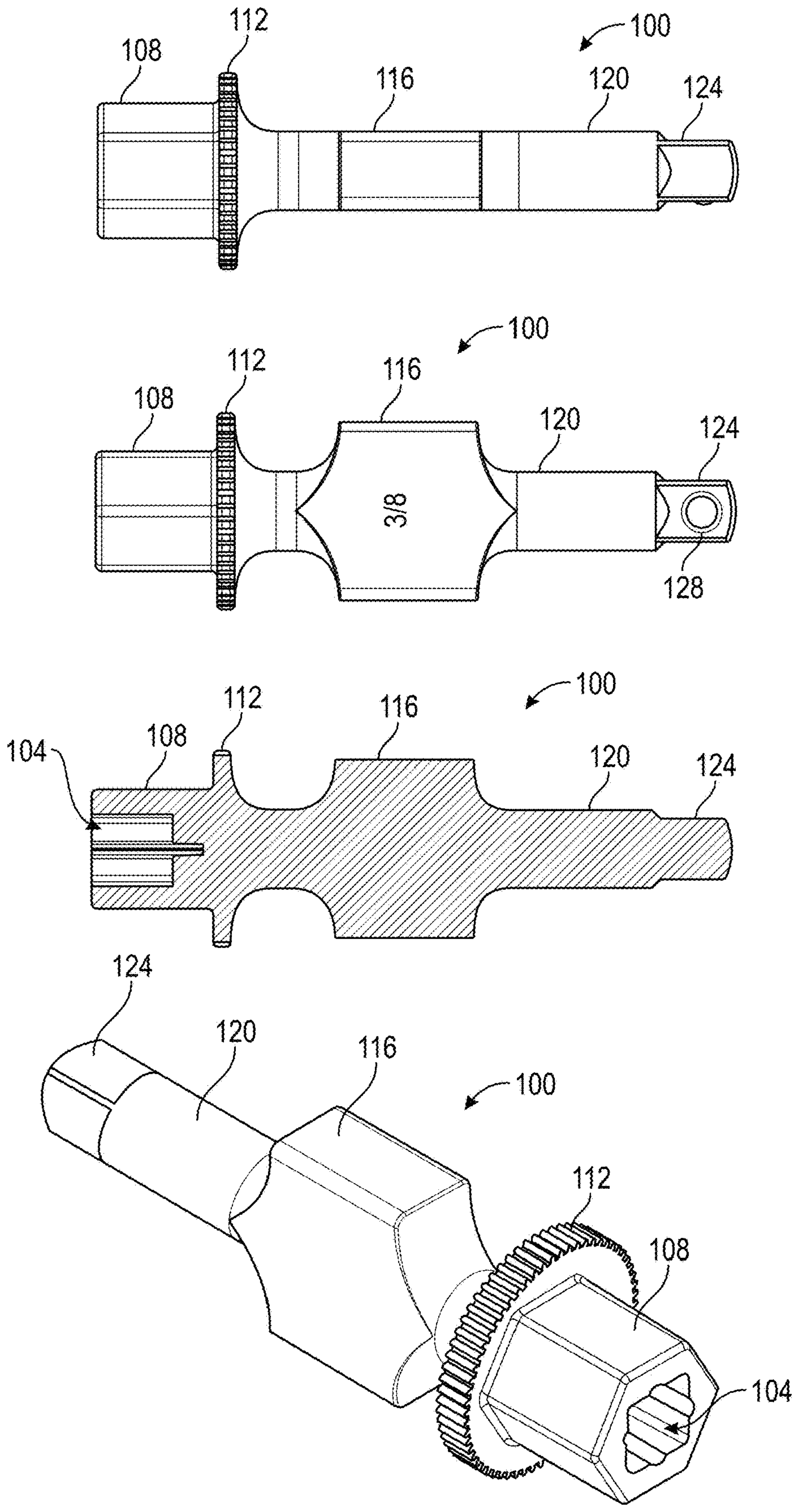
FIG. 1 illustrate various views of a tool extension in accordance with a first embodiment.

FIG. 1 provides various views of a socket wrench extension that provides improved control and stability that helps prevent slipping of the socket from the nut or bolt and allows additional rotational force and thus a higher torque to be applied to the nut or bolt to through the socket. A female wrench drive socket 104 is at a first end of the extension 100. The wrench drive socket 104 has dimensions to fit the male drive of a socket wrench. In this example, the wrench provides a ⅜-inch square drive. So, the wrench drive socket 104 is a ⅜-inch square hole. In this embodiment, a hexagonal drive 108 (sometimes referred to as a hex drive or a hexagonal prism), with a¾ inch width, is formed around the ⅜-inch square drive, where a first end of the hexagonal drive 108 is at the first end of the extension 100 and wherein the hexagonal drive 108 extends from the first end of the extension 100 towards the second end of the extension 100 to a flange 112 with a knurled edge. Flange 112 is sometimes referred to as a hand gripping flange because it is well suited for being gripped by a user's hand. In this embodiment, the flange with the knurled edge 112 has a generally circular cross-section with a diameter of about 1.13 inches. Between the flange with a knurled edge 112 and the second end of the extension 100 is a tool gripping flange 116. In this embodiment, the tool gripping flange 116 has a thickness about equal to a diameter of a bar 120 forming part of the extension 100. In this embodiment, the tool gripping flange 116 has a thickness of about ½ inches, a length of about 0.88 inches, and a width of about 0.88 inches. In this embodiment, the bar 120 extends from the tool gripping flange 116 to a male drive 124 formed by the second end of the extension 100. In this embodiment, a detent ball 128 is provided as part of the male drive 124 to help prevent a socket from falling off. Similarly, a detent hole may be formed in the sides of the wrench drive socket 104 to provide a connection with the wrench. In this embodiment, the male drive 124 is a ⅜-inch square drive. In this embodiment, the extension 100 is 4 inches long. In other embodiments, the extension 100 may have other lengths, such as being 6, 8, or 10 inches long.

In operation, a ratchet wrench is connected to the first end of the extension 100 by placing a male part of the ratchet wrench into the wrench drive socket 104. A socket is placed on the male drive 124 of the extension. The socket is placed over a nut or bolt. To facilitate placement, the flange with the knurled edge 112 may be gripped by hand. A wrench or pliers may be used to grip either the hexagonal drive 108 or tool gripping flange 116 to provide additional stability of extension 100 and additional rotational force on the nut or bolt. In an application, the handle of the ratchet wrench and the handle of a wrench used to grip the tool gripping flange 116 may make an angle of approximately 180°. Such a configuration provides increased stability and force in turning the nut or bolt.

Figure 2:
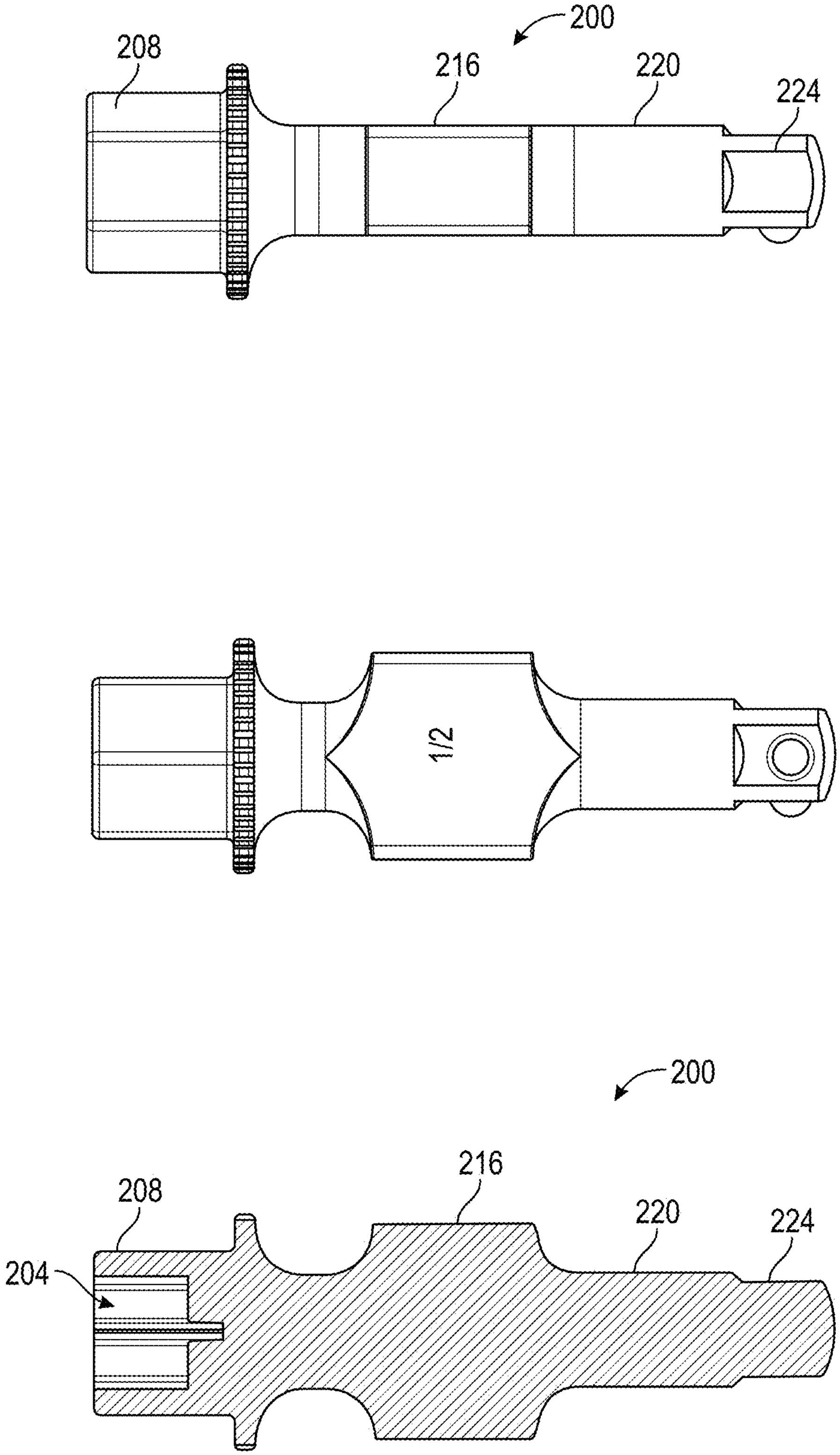
FIG. 2 illustrate various views of a tool extension in accordance with a second embodiment.

FIG. 2 illustrates another embodiment of an extension 200. In such an embodiment, a wrench drive socket 204 is a ½-inch square hole. In this embodiment, a hexagonal drive 208 is formed around the ½-inch square drive. The hexagonal drive 208 has a width of 0.88 inches. The tool gripping flange 216 has a thickness about equal to the diameter of the bar 220, which is about 0.6 inches. The extension has a male drive 224 which is a ½ inch square drive. In some embodiments, other dimensions may be about the same as the dimensions in the embodiment shown in FIG. 1.

Figure 3:
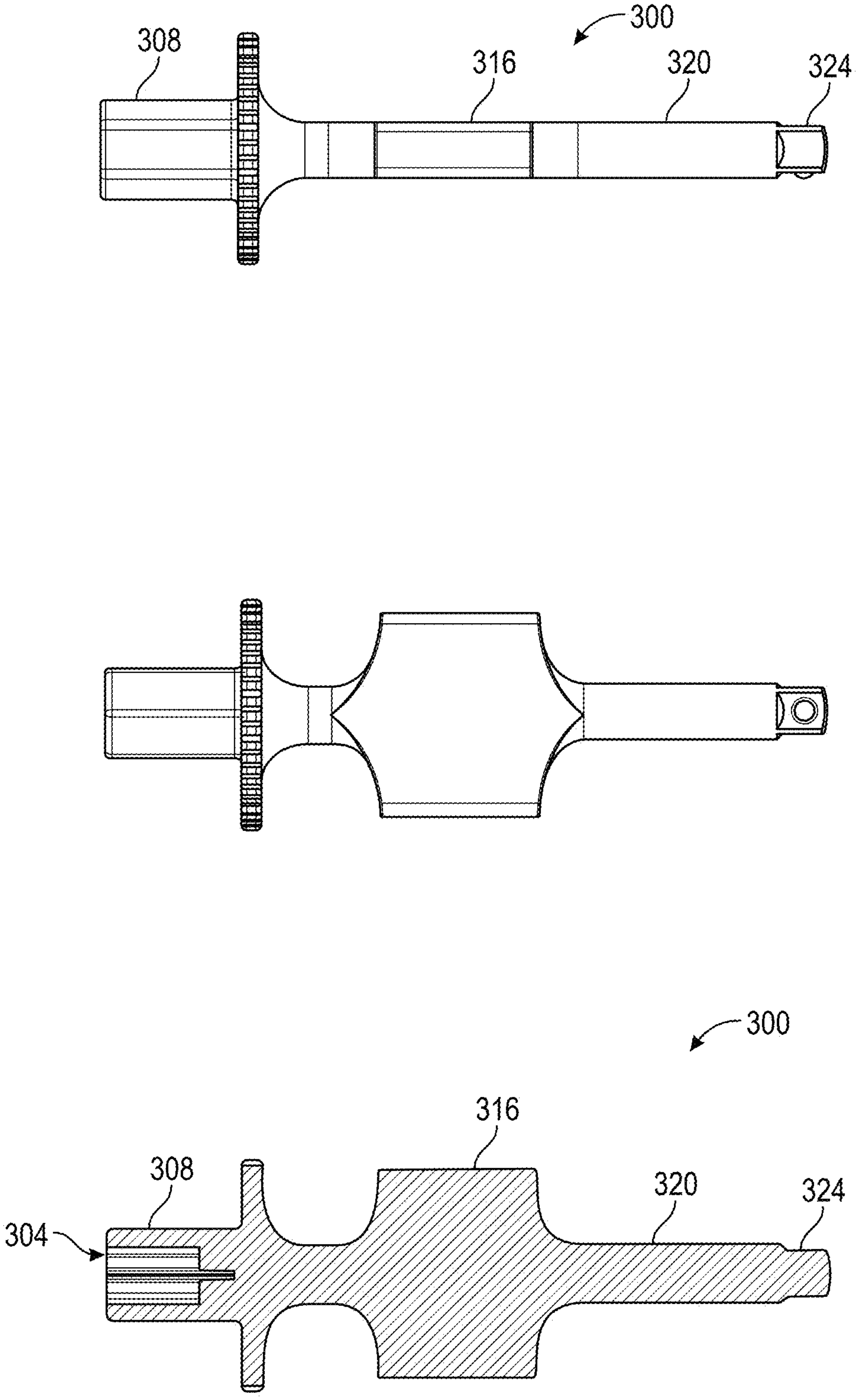
FIG. 3 illustrates various views of a tool extension in accordance with a third embodiment.

FIG. 3 illustrates another embodiment of an extension 300. In such an embodiment, a wrench drive socket 304 is a ¼-inch square hole. In this embodiment, a hexagonal drive 308 is formed around the ¼-inch square drive. The tool gripping flange 316 has a thickness about equal to the diameter of the bar 320, which is about 0.32 inches. The extension has a male drive 324 which is a ¼-inch square drive. In some embodiments, other dimensions may be about the same as the dimensions in the embodiment shown in FIG. 1.

Figure 4:
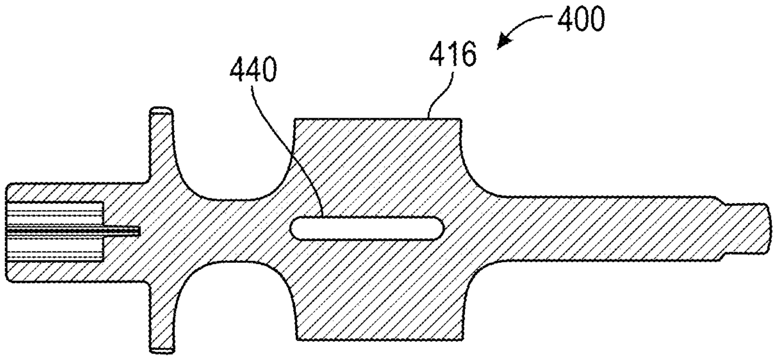
FIG. 4 is a cross-sectional view of a tool extension in accordance with a fourth embodiment.

FIG. 4 illustrates another embodiment of an extension 400. The tool gripping flange 416 has a slot 440 extending between front and back faces of tool gripping flange 416. In the illustrated embodiment, the slot 440 extends longitudinally relative to the socket wrench extension 100 and extends all of the way through the tool gripping flange 416 so that it is exposed and accessible on both the front and back surfaces of tool gripping flange 416. The slot is positioned so that it passes through the centerline of bar 420. With this arrangement, a screwdriver or pry bar (collectively referred to as a pry device) may be placed in the slot to provide a lever for rotating the extension 400. Since the slot passes through the centerline of bar 420, the torque applied by a pry device inserted into the slot aligns well to transfer such torque to the male drive 424. It should be apparent that the torque applied by such levering is in addition to torque applied by a socket wrench to the wrench drive socket 404. As can be seen in the figure, in some preferred embodiments, the tool gripping flange 416 is symmetrical about the bar 420 so the slot is also aligned with the longitudinal centerline of the front and back faces of the flange.

Figure 5:
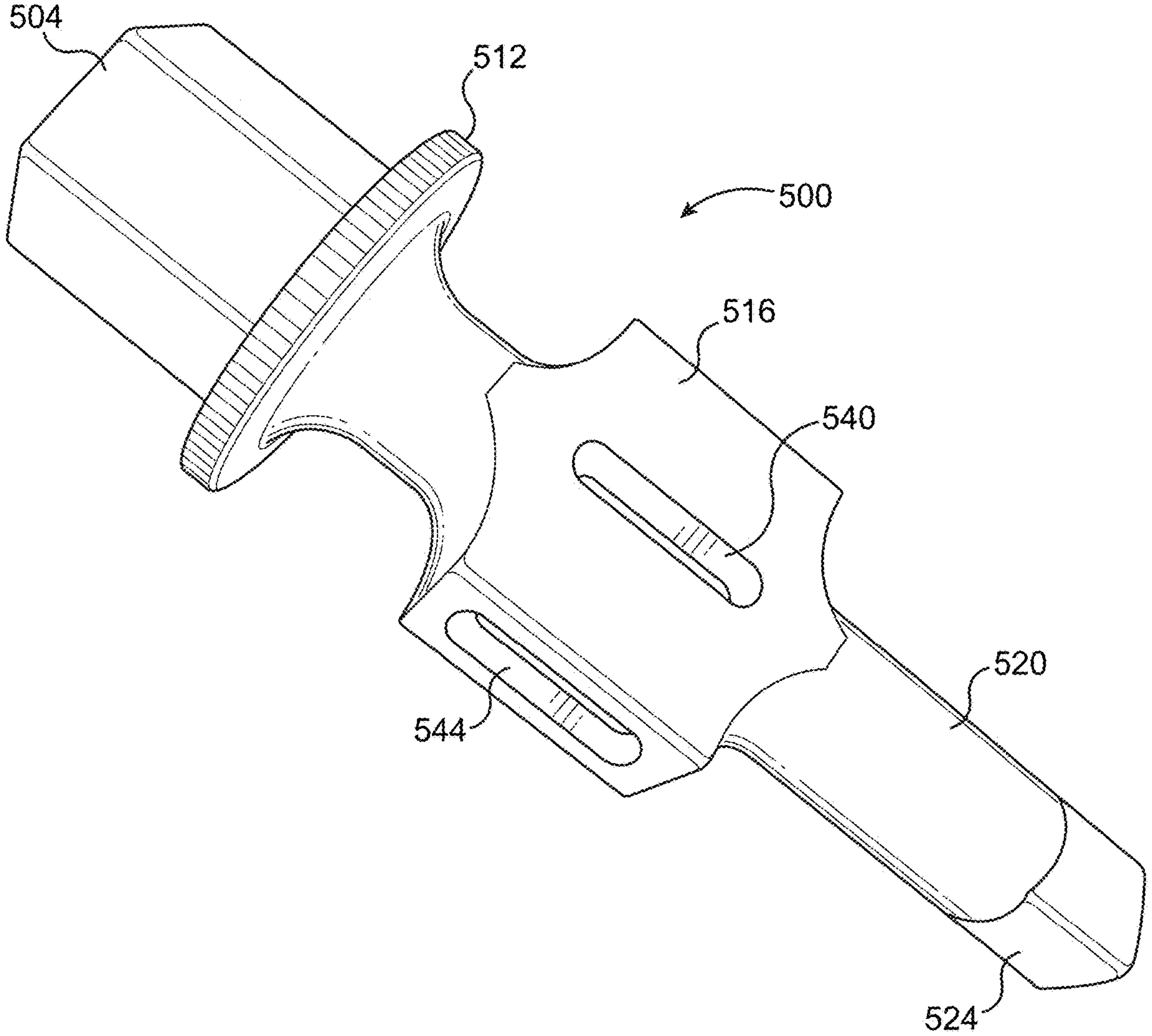
FIG. 5 is a perspective view of a socket wrench extension in accordance with a fifth embodiment.

FIG. 5 illustrates another embodiment of an extension 500. This embodiment is similar to the embodiment of FIG. 4 except that the tool gripping flange has two perpendicular lever receiving slots 540, 544 (sometimes referred to as "lever slots" or simply "slots"). The first slot has 540 is positioned similarly to slot 440 in the embodiment of FIG. 4. As such, slot 540 extends all of the way through the tool gripping flange 516 so that it is exposed and accessible on both the front and back surfaces of tool gripping flange 516. The second slot 544 extends between side surfaces of the tool gripping flange 516. Analogously to the first slot, the second slot passes laterally entirely through the tool gripping flange so that it is exposed and accessible on both right and left side surfaces of the tool gripping flange 516. Also, like the first slot 540, the second slot 544 passes through the centerline of bar 520 such that the slots meet in the center of bar 520. With this arrangement, a screwdriver or pry bar may be placed in either slot 540 or slot 544 to provide a lever for rotating the extension 500. This gives the user more flexibility in determining where to insert the pry instrument. Regardless of which slot is used, since the slot passes through the centerline of bar 520, the torque applied by a pry device inserted into the slot can aligns well to transfer such torque to the male drive 524. The torque applied by such levering is in addition to torque applied by a socket wrench to the wrench drive socket 504. It is noted that due to space constraints, the slots 440, 540 and 544 in FIGS. 4 and 5 respectfully are generally better suited for use in conjunction with generally diameter socket extensions—e.g., extensions having diameters of 2 inch or larger.

Figure 6:
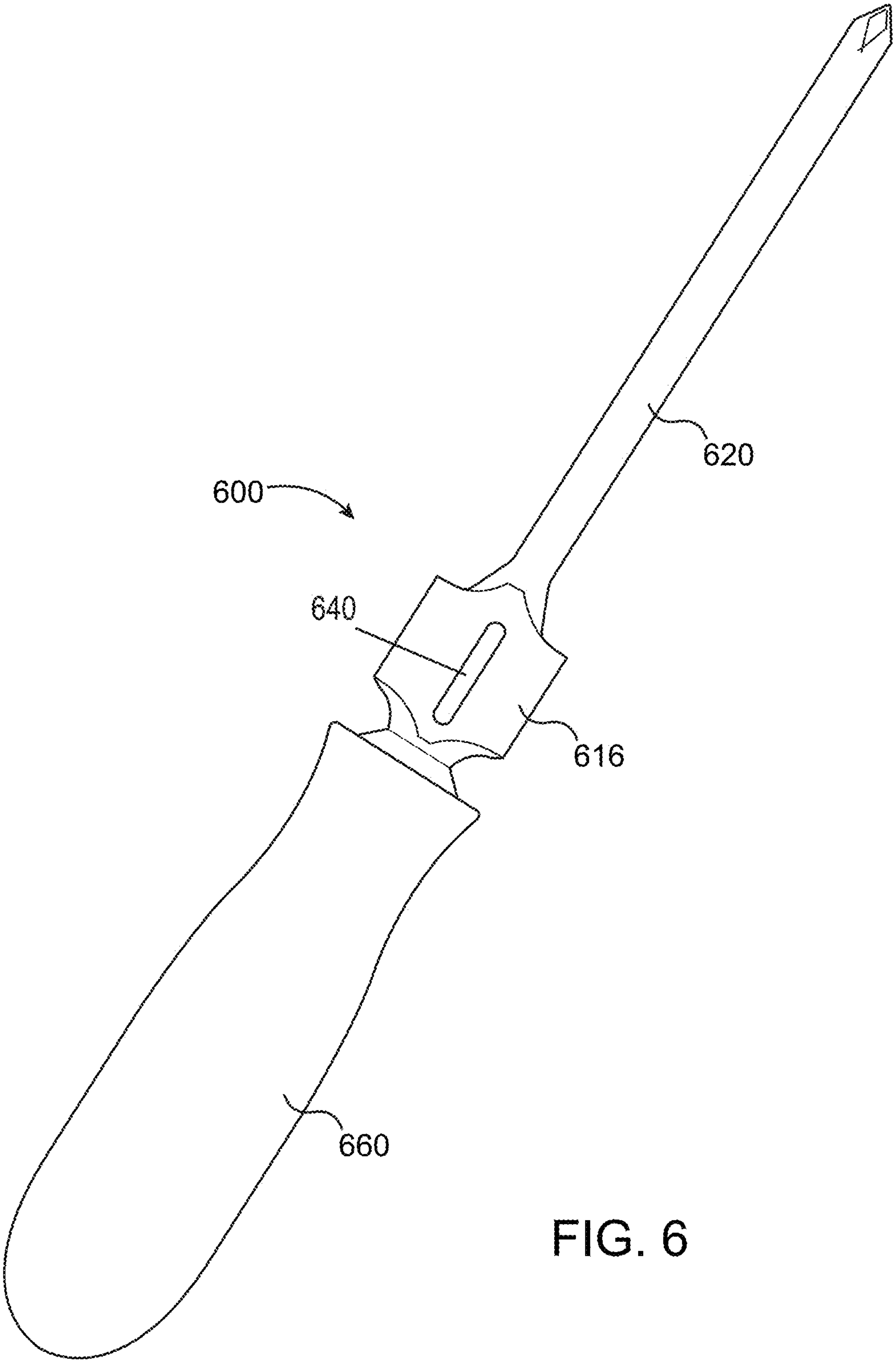
FIG. 6 is a perspective view of a screwdriver with a tool grip flange.

FIG. 6 illustrates a different embodiment in which a tool gripping flange 616 is provided on the shaft 620 of a screwdriver 600. The tool gripping flange 616 may have the same or substantially the same form as any of the previously described embodiments. Therefore, the tool gripping flange can be used to apply additional torque to the shaft of the screwdriver in situations in which more torque is required than can readily provided by manipulating handle 660 of the screwdriver alone. In the embodiment shown in FIG. 6, a single lever slot 640 is provided in tool gripping flange 616 similar to the flange slots shown in FIGS. 4 and 5. In other embodiments, a pair of orthogonal slots may be provided similarly to the socket wrench extension of FIG. 5. In still other embodiments, not lever slots may be provided.

While this disclosure has been described in terms of several preferred embodiments, there are alterations, modifications, permutations, and various substitute equivalents, which fall within the scope of this disclosure. It should also be noted that there are many alternative ways of implementing the methods and apparatuses of the present disclosure. For example, in other implementations the described hand flanges and tool gripping flanges may be provided on a variety of other tools having longitudinally extending shafts or bars that may sometime benefit from the application of additional torque compared to the torque that can practically be applied using the standard tool.

In the illustrated embodiments, specific tool dimensions (e.g., socket wrench extension dimensions) are sometimes used. However, it should be appreciated that the same concepts can be applied to any such socket wrench extension. It is therefore intended that the following appended claims be interpreted as including all such alterations, modifications, permutations, and various substitute equivalents as fall within the true spirit and scope of the present disclosure.

What is claimed is:

1. A screwdriver comprising:

a handle;

a shaft that extends distally from the handle;

a drive tip at a distal end of the shaft; and a tool gripping flange integrally formed with the shaft at a location between the handle and the drive tip, the tool gripping flange being enlarged relative to the shaft and having substantially flat front and back surfaces, the tool gripping flange including first and second pry slots that extend through the tool gripping flange and intersect along a longitudinal centerline of the shaft, wherein, the first pry slot is elongated longitudinally and extends laterally from the front surface of the tool gripping flange to the back surface of the tool gripping flange such that the first pry slot opens on both the front and back surfaces of the tool gripping flange, the second pry slot is elongated longitudinally and extends through the tool gripping flange from a first side edge of the tool gripping flange to a second side edge of the tool gripping flange, the first and second pry slots extend substantially perpendicular to each other and intersect along a longitudinal centerline of the shaft;

the first and second pry slots are each unincumbered such that a user may selectively (i) insert a pry tool into the first or second pry slot to facilitate adding torque to the screwdriver during use, and alternatively (ii) engage the front and back surfaces of the tool griping flange with a gripping tool to facilitate adding torque to the screwdriver during use; and a thickness of the tool gripping flange between the top and bottom surfaces is narrower than a width of the tool gripping flange between the first and second surfaces such that a lateral cross section of the tool gripping flange extending through the top surface, the bottom surface, the first side surface and the second side surface is substantially rectangular, the front and back surfaces of the tool gripping flange are substantially parallel;

the first and second side edges of the tool gripping flange are substantially parallel, and a width of the tool gripping flange between the first and second side surfaces is wider than distally and proximally adjacent portions of the screwdriver.

* * * * *